(12) United States Patent
Nettleton et al.

(10) Patent No.: US 8,223,809 B2
(45) Date of Patent: Jul. 17, 2012

(54) SUPPRESSION OF PARASITIC LASING

(75) Inventors: John E. Nettleton, Fairfax Station, VA (US); Dallas N. Barr, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 205 days.

(21) Appl. No.: 12/782,994

(22) Filed: May 19, 2010

(65) Prior Publication Data

US 2011/0286476 A1   Nov. 24, 2011

(51) Int. Cl.
*H01S 3/11* (2006.01)
(52) U.S. Cl. .............................. 372/10; 372/39; 372/54

(58) Field of Classification Search ............... 372/10, 372/39
See application file for complete search history.

(56) References Cited

U.S. PATENT DOCUMENTS

| | | | |
|---|---|---|---|
| 4,809,283 A | 2/1989 | Harter | |
| 5,936,984 A | 8/1999 | Meissner et al. | |
| 6,914,928 B2 * | 7/2005 | Trussell, Jr. | 372/71 |
| 2011/0150011 A1 * | 6/2011 | Young et al. | 372/6 |

* cited by examiner

*Primary Examiner* — Dung Nguyen
(74) *Attorney, Agent, or Firm* — Richard J. Kim

(57) ABSTRACT

A laser gain medium crystal comprising a square rod of laser gain medium material having top and bottom surfaces that are finely ground to introduce scattering surfaces to cancel parasitic lasing. The square rod of laser gain material has input and output faces and side surfaces, and portions of the side surfaces near the output face of the square rod are finely ground to introduce scattering surfaces to cancel parasitic lasing. The rest of the side surfaces of the square rod are polished.

9 Claims, 1 Drawing Sheet

SUPPRESSION OF PARASITIC LASING

GOVERNMENT INTEREST

The invention described herein may be manufactured, used, sold, imported, and/or licensed by or for the Government of the United States of America.

FIELD OF THE INVENTION

This invention relates in general to solid state lasers and more particularly, to diode-pumped solid state lasers.

BACKGROUND OF THE INVENTION

Laser range finders and laser designators are becoming an increasingly vital component in high precision targeting engagements. The precise and accurate range to target information is an essential variable provided by laser range finders to precisely designate a target.

Unfortunately, current fielded laser range finders and laser designators are bulky, heavy and expensive. These laser range finders and laser designators were not developed with the individual user in mind.

It is therefore an object of this disclosure to make the development and fabrication of a very compact laser range finder or laser designator possible.

SUMMARY OF THE INVENTION

This and other objects of the invention are achieved in one aspect by a laser gain medium crystal comprising a square rod of laser gain medium material having top and bottom surfaces that are finely ground to introduce scattering surfaces to cancel parasitic lasing.

Another aspect of the invention involves a laser gain medium crystal comprising a square rod of laser gain medium material having input and output faces and side surfaces, portions of the side surfaces near the output face of the square rod being finely ground to introduce scattering surfaces to cancel parasitic lasing.

Yet another aspect of the invention involves a method of making a laser gain medium crystal comprising the steps of providing a square rod of laser gain medium material having top and bottom surfaces, and finely grinding the top and bottom surfaces of the square rod to introduce scattering surfaces to cancel parasitic lasing.

Size, weight, performance and production costs are parameters that benefit by this invention. The invention simplifies the producibility of a laser range finder or laser designator system. The fabrication of the laser gain medium crystals using the inventive method can be done using batch processing. Large rectangular, laser optical components can be polished and properly coated. This batch process can greatly reduce the overall fabrication costs of the laser cavity. The inventive method is very simple. It can reduce the cost of processing the laser gain medium crystals by not requiring a fine polish and then having to try to suppress the parasitic lasing by adding additional cladding or labor intensive and expensive coatings.

The present invention may be used as the laser gain medium in very compact laser range finders and laser designators. The design of the inventive method also lends itself to placement in other laser-based devices. These may be medical devices, industrial tools or scientific equipment that would benefit from the size/weight reduction, dependable performance, and low cost of the inventive method.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
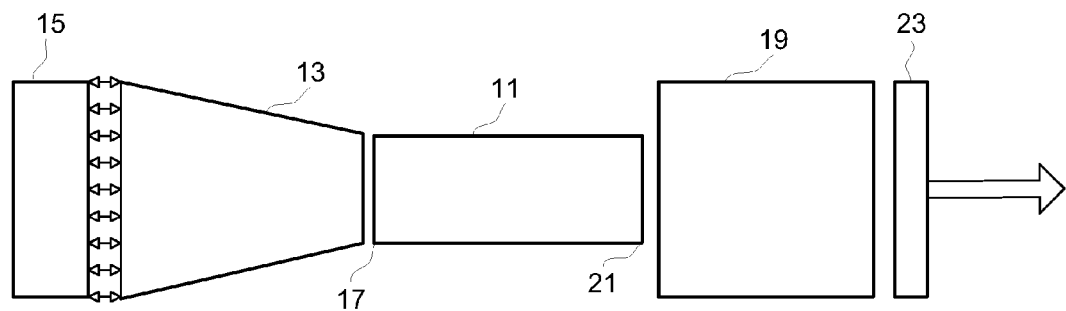
FIG. 1 shows an exemplary embodiment of a total internal reflecting laser cavity.

FIG. 1 shows an exemplary embodiment of a total internal reflecting laser cavity. The laser cavity consists of several optical components fused into one "block" or pseudo-monolithic laser cavity. It is termed "pseudo-monolithic" because many components are incorporated into the structure. It is called "a total internal reflecting cavity" because its design is intended for laser diode pumping from the end and the laser cavity directs all the pumping radiation into the laser gain medium. Referring to FIG. 1, the laser cavity includes a gain medium crystal 11, a total internal reflecting concentrator block 13 whose input end is sized to fit an external spatially extended stack of diode laser bars 15, and whose output end is fused to the input face 17 of the gain medium crystal 11, a Q-switch 19 fused to the output face 21 of the gain medium crystal 11, and an output coupler 23 fused to the Q-switch 19. The gain medium may be Nd:YAG, Nd:YLF, or Nd:YVO4, for example. The input face 17 of the gain medium crystal 11 has a high reflectivity at the crystal's laser emission wavelength and acts as one of two mirrors defining an optical resonator. The output coupler 23 comprises a mirror that is partially transmitting at the gain medium laser emission wavelength and acts as the other mirror of the optical resonator.

In operation, the total internal reflecting concentrator block 13 contains and directs pumping radiation from the external spatially extended stack of diode laser bars 15 to the gain medium crystal 11 to generate amplification in the gain medium, and the mirrors provide optical feedback to sustain laser oscillation in the optical resonator. The Q-switch 19 prevents the laser cavity from resonating until the population inversion has built up fully, resulting in pulsed operation of the laser cavity.

Figure 2:
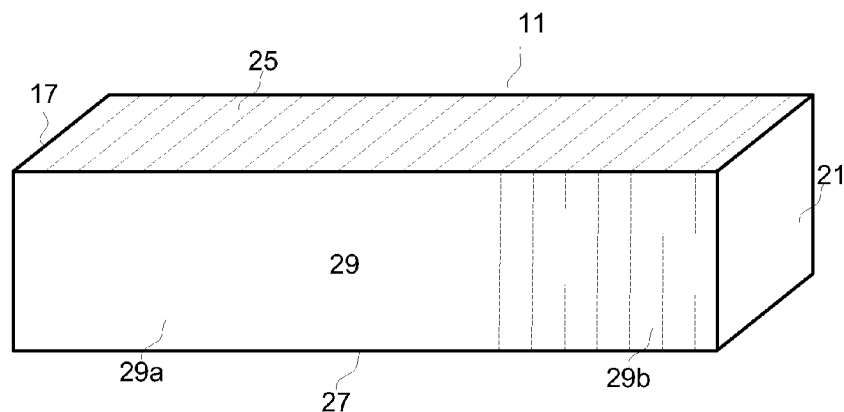
FIG. 2 shows cancellation of parasitic lasing in an exemplary gain medium.

Referring to FIG. 2, cancellation of parasitic or "ghost" lasing in the gain medium crystal 11 is achieved by polishing the gain medium crystal on less than all sides in order to create rough scattering surfaces. For example, the top 25 and bottom 27 of the gain medium crystal 11 and portions 29 of the sides near the output face 21 may be finely ground.

In one exemplary embodiment, a gain medium crystal 11 as shown in FIG. 2 can be a square rod, e.g., 25 mm×5 mm×5 mm (or, alternatively, 30 mm×5 mm×5 mm). For example, the input 17 and/or output 21 faces can have dimensions 5 mm×5 mm. Further, the input 17 surface can be flat and can have one or more of the following exemplary surface/coating characteristics: HR@1064 nm (>99%, +/−1 deg); HT @790-820 nm (>97%, >40 deg, S&P polarizations); Surface Figure: lambda/10 @633 nm; Surface Roughness: <12 A rms; and Surface Quality: 10/5. The output face 21 can also be flat and can have one or more of the following exemplary surface/coating characteristics: AR@ 1064 nm; PR@ 790-820 nm (>40 deg) (~75%). These exemplary end surface characteristics are provided as examples, and can vary to produce such gain medium crystal 11.

Further, such an exemplary gain medium crystal 11 can be a square rod of material, e.g., 0.7% doped Nd:YAG. In such an exemplary embodiment, cancellation of parasitic or "ghost" lasing in the gain medium crystal 11 can be achieved by polishing and/or finely grinding the top 25 surface, the bottom 27 surface, and a portion 29b of the two sides near the output face 21 of the gain medium crystal 11. For example, besides grinding the input 17 and output 21 faces, the top 25 and bottom 27 of the gain medium crystal 11 can also be fine ground. At least the side surfaces 29a of the square rod can be polished. Portions 29b of sides 29 can be fine ground, e.g., approximately 8 mm on the two sides from the output 21 end. Tolerances for side dimensions can be +/−0.05 mm. Tolerance for the length can be between +0.2 to −0.0 mm.

It is obvious that many modifications and variations of the present invention are possible in light of the above teachings. It is therefore to be understood that within the scope of the appended claims, the invention may be practiced otherwise than as described.

What is claimed is:

1. A laser cavity comprising:
    a square rod of laser gain medium material having an input face, an output face, and at least top and bottom surfaces that are finely ground to introduce scattering surfaces to cancel parasitic lasing;
    a concentrator block having an input end sized to fit a stack of diode laser bars, and an output end fused to the input face of the laser gain medium material;
    a Q-switch fused to the output face of the laser gain medium material; and
    an output coupler fused to the Q-switch, wherein the square rod of laser gain material has side surfaces, and portions of the side surfaces near the output face of the square rod are finely ground to introduce scattering surfaces to cancel parasitic lasing.

2. The laser cavity recited in claim 1 wherein the rest of the side surfaces of the square rod are polished.

3. The laser cavity recited in claim 1 wherein the laser gain medium material is Nd:YAG, Nd:YLF, or Nd:YVO4.

4. A laser gain medium crystal for a laser cavity, comprising:
    a square rod of laser gain medium material having input and output faces and side surfaces, portions of the side surfaces near the output face of the square rod being finely ground to introduce scattering surfaces to cancel parasitic lasing.

5. The crystal recited in claim 4 wherein the rest of the side surfaces of the square rod are polished.

6. The crystal recited in claim 4 wherein the square rod of laser gain medium material has top and bottom surfaces that are finely ground to introduce scattering surfaces to cancel parasitic lasing.

7. The crystal recited in claim 4 wherein the laser gain material is Nd:YAG, Nd:YLF, or Nd:YVO4.

8. A method of making a laser gain medium crystal comprising the steps of:
    providing a square rod of laser gain medium material having top and bottom surfaces, wherein the square rod of laser gain medium has input and output faces and side surfaces;
    finely grinding the top and bottom surfaces of the square rod to introduce scattering surfaces to cancel parasitic lasing; and
    finely grinding portions of the side surfaces near the output face of the square rod to introduce scattering surfaces to cancel parasitic lasing.

9. The method recited in claim 8, including the step of polishing the rest of the side surfaces of the square rod.

\* \* \* \* \*